United States Patent
Obu et al.

(10) Patent No.: US 7,619,834 B2
(45) Date of Patent: Nov. 17, 2009

(54) ZOOM LENS SYSTEM AND OPTICAL APPARATUS INCLUDING THE SAME

(75) Inventors: Kenji Obu, Utsunomiya (JP); Ken Wada, Shioya-gun (JP); Takashi Okada, Utsunomiya (JP); Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 12/037,044

(22) Filed: Feb. 25, 2008

(65) Prior Publication Data

US 2008/0204902 A1 Aug. 28, 2008

(30) Foreign Application Priority Data

Feb. 27, 2007 (JP) ............................. 2007-047136

(51) Int. Cl.
*G02B 9/60* (2006.01)
*G02B 15/14* (2006.01)
(52) U.S. Cl. ...................... 359/770; 359/689
(58) Field of Classification Search ................. 359/770, 359/755, 763, 689, 682
See application file for complete search history.

(56) References Cited

U.S. PATENT DOCUMENTS

| 6,014,267 | A  | 1/2000  | Tsurutani |
| 6,809,879 | B2 | 10/2004 | Mihara    |
| 6,850,373 | B2 | 2/2005  | Mihara    |
| 7,079,328 | B2 | 7/2006  | Kuba      |
| 7,184,221 | B2 | 2/2007  | Misaka    |

FOREIGN PATENT DOCUMENTS

JP 2004-117828 4/2004

*Primary Examiner*—Alicia M Harrington
(74) *Attorney, Agent, or Firm*—Canon USA Inc IP Div

(57) ABSTRACT

A zoom lens system includes a first lens unit having a negative refractive power, at least one lens unit having a positive refractive power, and an optical element composed of a material having an Abbe number and a partial dispersion that satisfy a predetermined condition. The first lens unit, an aperture stop, and the at least one lens unit are arranged in this order from the object side to the image side. The zoom lens system performs zooming while changing the distance between the lens units. The focal length $f_N$ of the optical element, the distance Lt from the aperture stop to the optical element in the telephoto end state, the overall length of the zoom lens system Tt in the telephoto end state, and the focal lengths fw and ft in the wide-angle end and telephoto end states are set at appropriate values.

8 Claims, 13 Drawing Sheets

ZOOM LENS SYSTEM AND OPTICAL APPARATUS INCLUDING THE SAME

BACKGROUND OF THE INVENTION

1. Field of the Invention

The present invention relates to a zoom lens system and an optical apparatus including the same. The present invention is suited for, for example, a single-lens reflex camera, a digital still camera, a camcorder, and a projector.

2. Description of the Related Art

The density of pixels of an image pickup device for use in an image pickup apparatus (optical apparatus), such as a digital camera or a camcorder, is increased more and more. With this, it is desired that an image taking lens (image pickup optical system) for use in such an image pickup device with an increased density of pixels have high resolution.

In an image pickup apparatus (e.g., a digital camera or a camcorder), various kinds of optical members, such as a low-pass filter and an infrared cutoff filter, are disposed between the backmost end of a lens system and an image pickup device. This requires that an image pickup optical system have a relatively long back focus.

Additionally, because variations in characteristics of an incident angle in an image pickup device used in this type of image pickup apparatus are large, the image pickup optical system needs to have excellent telecentric characteristics at the image side.

Examples of an image pickup optical system that meets these conditions include various zoom lens systems that contain a lens unit having a negative refractive power disposed at an object side and a lens unit having a positive refractive power disposed at an image side, so-called retrofocus zoom lens systems.

One example of this type of zoom lens system is a zoom lens system that includes three lens units, consisting of a lens unit having a negative refractive power, a lens unit having a positive refractive power, and a lens unit having a positive refractive power arranged in this order from the object side to the image side, that has a longer back focus and good image-side telecentric characteristics.

One such example of this type of zoom lens system, which includes three lens units, is a zoom lens system that is compact as the entire system while at the same time achieving high image forming performance by use of an aspherical surface and a cemented lens appropriately arranged, as described in U.S. Pat. No. 6,809,879.

Another example is a projection zoom lens system including three lens units that favorably corrects a lateral chromatic aberration while maintaining good telecentric characteristics by use of an aspherical surface and anomalous dispersion glass appropriately arranged, as described in U.S. Pat. No. 6,014,267.

Still another example is a zoom lens system that favorably corrects residual chromatic aberration while at the same time achieving high magnification and being compact as the entire system by use of an aspherical surface and a diffractive optical surface appropriately arranged in an optical path, as described in Japanese Patent Laid-Open No. 2004-117828.

One example of a zoom lens system that has a long back focus and good image-side telecentric characteristics is a zoom lens system including four lens units, consisting of a lens unit having a negative refractive power, a lens unit having a positive refractive power, a lens unit having a negative refractive power, and a lens unit having a positive refractive power arranged in this order from the object side to the image side, as described in U.S. Pat. No. 6,850,373 and No. 7,079,328.

One example of a zoom lens system that has a long back focus is a zoom lens system including six lens units, consisting of a lens unit having a negative refractive power, a lens unit having a positive refractive power, a lens unit having a negative refractive power, a lens unit having a positive refractive power, a lens unit having a negative refractive power, and a lens unit having a positive refractive power arranged in this order from the object side to the image side, as described in U.S. Pat. No. 7,184,221.

In typical zoom lens systems, the occurrence of chromatic aberration and variations in the chromatic aberration caused by zooming increase with an increase in zoom ratio. In particular, large secondary spectrums of axial chromatic aberration and lateral chromatic aberration occur in a telephoto state. Satisfactorily correcting this is difficult.

In contrast, when a lens composed of a material that exhibits anomalous dispersion (hereinafter referred to as an anomalous dispersion material) is used in an optical system, the occurrence of chromatic aberration in a telephoto state can be reduced by its anomalous dispersion effects.

However, simply arranging a lens composed of an anomalous dispersion material in an optical path is not sufficient for correction of chromatic aberration over the entire zoom range and improvement in image quality while increasing the zoom ratio.

To satisfactorily correct chromatic aberration over the entire zoom range and obtain high optical performance while increasing the zoom ratio, it is important to arrange a lens composed of an anomalous partial dispersion material in an optical system and to appropriately set the refractive power and other factors.

In particular, in a retrofocus zoom lens system, which includes a lens unit having a negative refractive power arranged in the forefront, the lens units are arranged asymmetrically with respect to an aperture stop. Therefore, it is important how a lens composed of an anomalous partial dispersion material is used.

The zoom lens system disclosed in U.S. Pat. No. 6,809,879 mentioned above achieves high performance with an entire system that is compact, but unfortunately it has a tendency to exhibit a large amount of axial chromatic aberration in the telephoto end state. The zoom lens system disclosed in U.S. Pat. No. 6,014,267 mentioned above can favorably correct lateral chromatic aberration by using anomalous dispersion glass, but unfortunately it has a tendency to have residual axial chromatic aberration, a so-called secondary spectrum.

In addition, because the refractive index of anomalous dispersion glass is low, from the viewpoint of aberration correction, limitations are imposed on a used position thereof.

The zoom lens system disclosed in Japanese Patent Laid-Open No. 2004-117828 corrects axial chromatic aberration occurring in the telephoto end state by using a diffractive optical element. However, producing a diffractive optical element is more difficult than a typical refractive optical element, thus limiting the use of the diffractive optical element.

SUMMARY OF THE INVENTION

The present invention provides a zoom lens system that can correct various aberrations, including chromatic aberration, over the entire zoom range and that has high optical performance and also provides an optical apparatus including the zoom lens system.

According to an aspect of the present invention, a zoom lens system includes a first lens unit having a negative refractive power, at least one lens unit having a positive refractive power, and an optical element. The optical element is composed of a material that satisfies the following condition:

$$0.755 < \theta_N - (-1.665 \times 10^{-7} \cdot v_N^3 + 5.213 \times 10^{-5} \cdot v_N^2 - 5.656 \times 10^{-3} \cdot v_N) < 1.011$$

where $\theta_N = (Ng_N - NF_N)/(NF_N - NC_N)$ and $v_N$ is the Abbe number of the material, and $Ng_N$, $NF_N$, and $NC_N$ are the refractive indices of the material for the g-line, F-line, and the C-line, respectively. The first lens unit, an aperture stop, and the at least one lens unit are arranged in this order from an object side to an image side. The zoom lens system performs zooming while changing the distance between the first and the at least one lens unit. The zoom lens system satisfies the following conditions:

$$-0.1 < Lt/Tt < 0.2$$

$$0.20 < \sqrt{(fw \cdot ft)}/f_N < 0.80$$

where $f_N$ is the focal length of the optical element, Lt is the distance from the aperture stop to the optical element in a telephoto end state, Tt is the overall length of the zoom lens system in the telephoto end state, fw is the focal length in a wide-angle end state, and ft is the focal length in the telephoto end state.

Further features of the present invention will become apparent from the following description of exemplary embodiments (with reference to the attached drawings).

DESCRIPTION OF THE EMBODIMENTS

Embodiments of a zoom lens system and an optical apparatus that includes the zoom lens system will be described below.

The zoom lens system according to embodiments of the present invention is a zoom lens system in which a first lens unit having a negative refractive power, an aperture stop, and at least one lens unit having a positive refractive power are arranged in this order from the object side to the image side. The zoom lens system performs zooming while changing the distance between the lens units.

Figure 1:
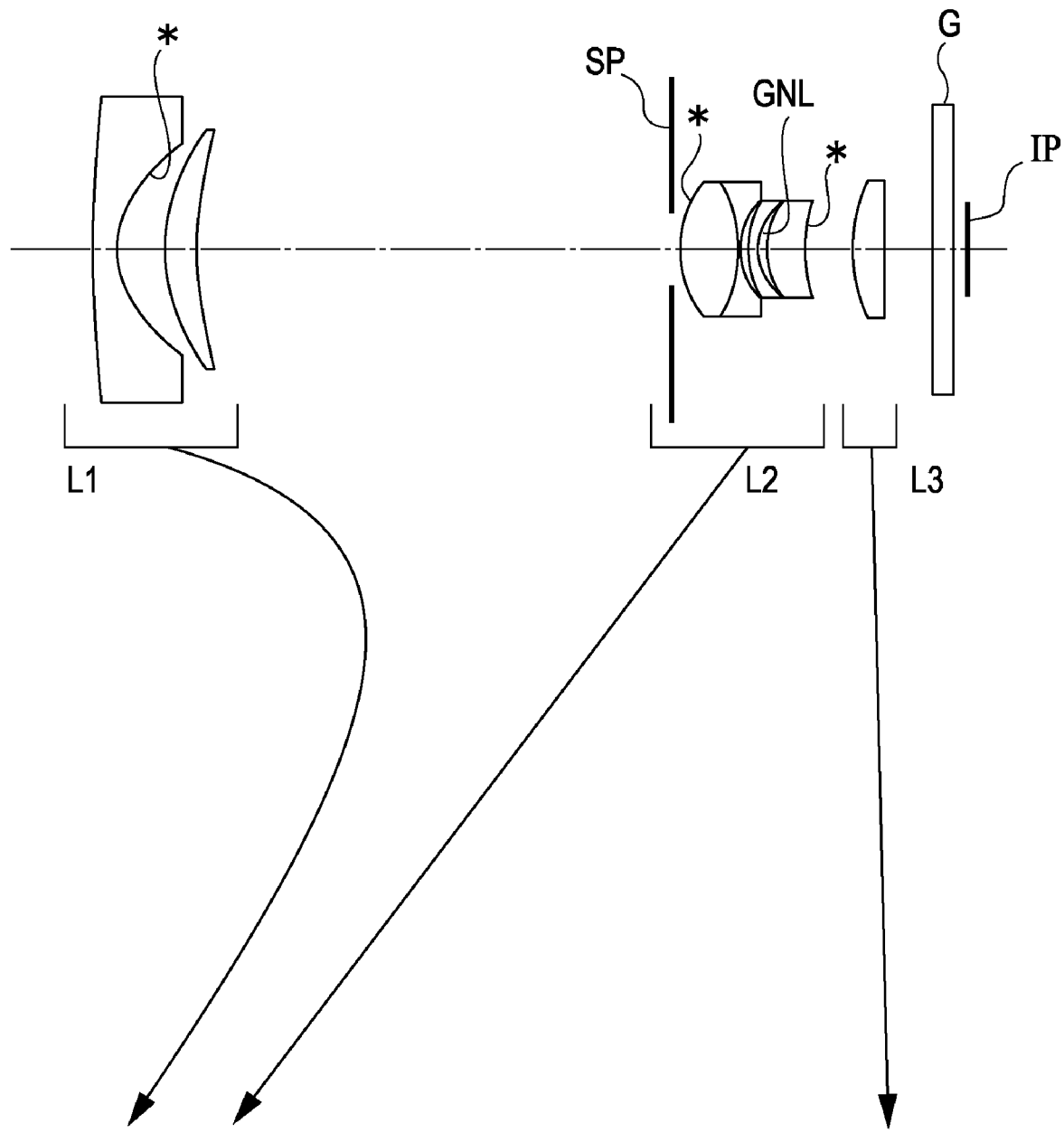
FIG. 1 illustrates a cross-sectional view of a zoom lens system in a wide-angle end state and a locus in zooming according to a first embodiment of the present invention.

FIG. 1 illustrates a cross-sectional view of a zoom lens system in a wide-angle end state (a state corresponding to a short focal length end) and a locus in zooming according to a first embodiment of the present invention.

Figure 2:
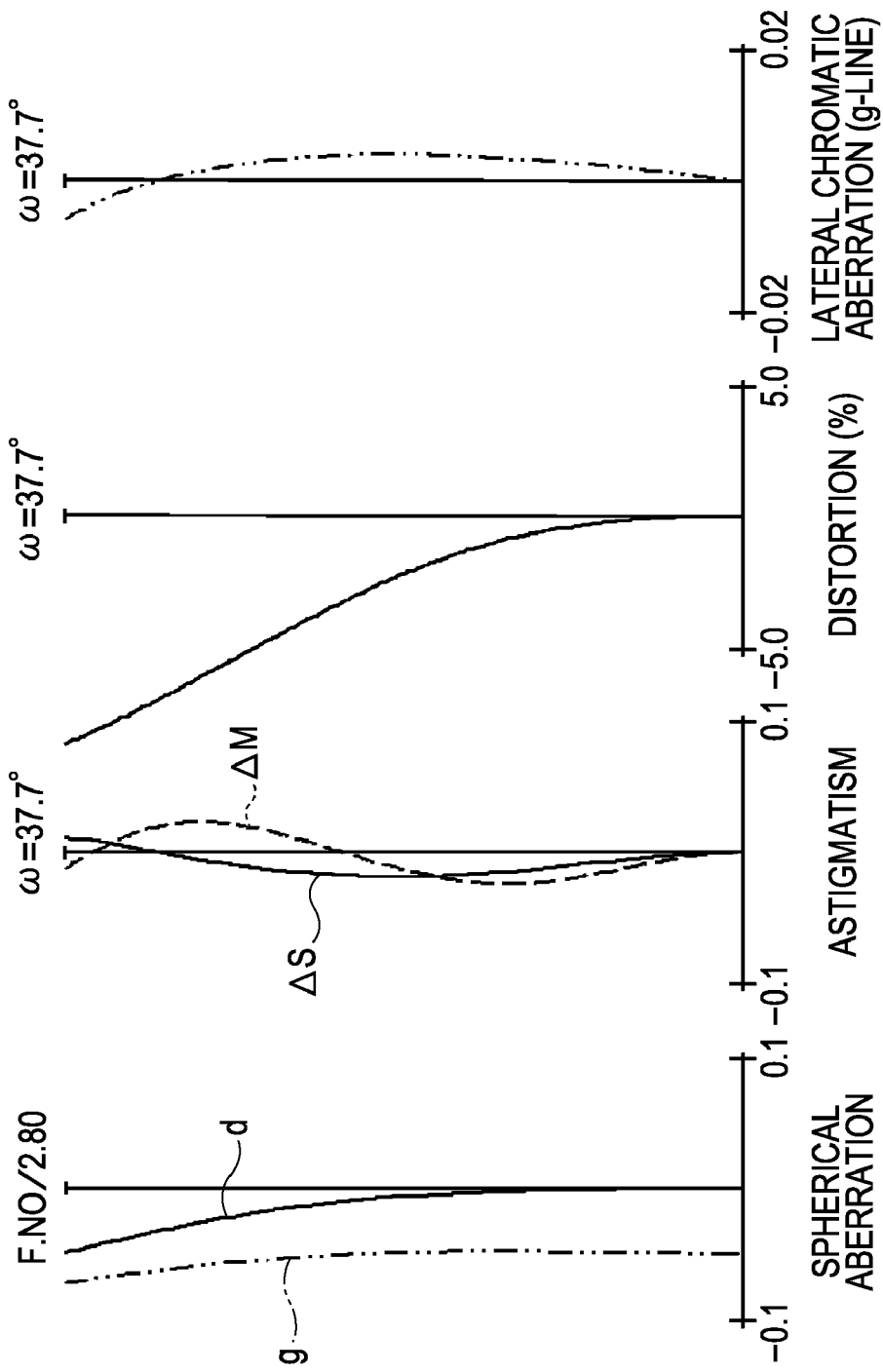
FIG. 2 illustrates aberrations occurring when the zoom lens system according to the first embodiment is in the wide-angle end state.
Figure 3:
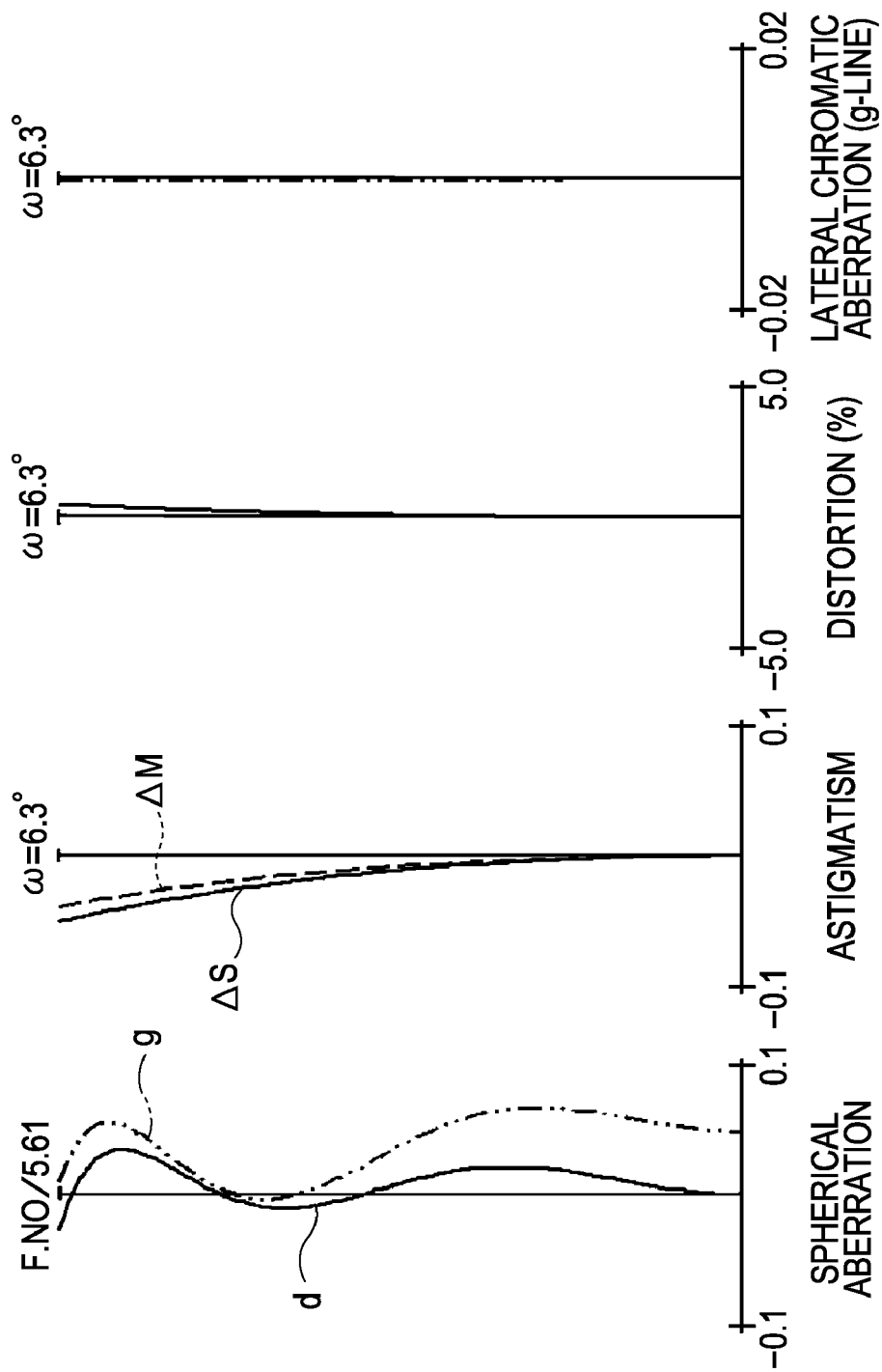
FIG. 3 illustrates aberrations occurring when the zoom lens system according to the first embodiment is in a telephoto end state.

FIGS. 2 and 3 illustrate aberrations occurring when the zoom lens system of the first embodiment is in the wide-angle end state and in a telephoto end state (a state corresponding to a long focal length end), respectively.

The zoom lens system according to the first embodiment has a zoom ratio of 7× and an angle of view of 75.3° to 12.7°.

Figure 4:
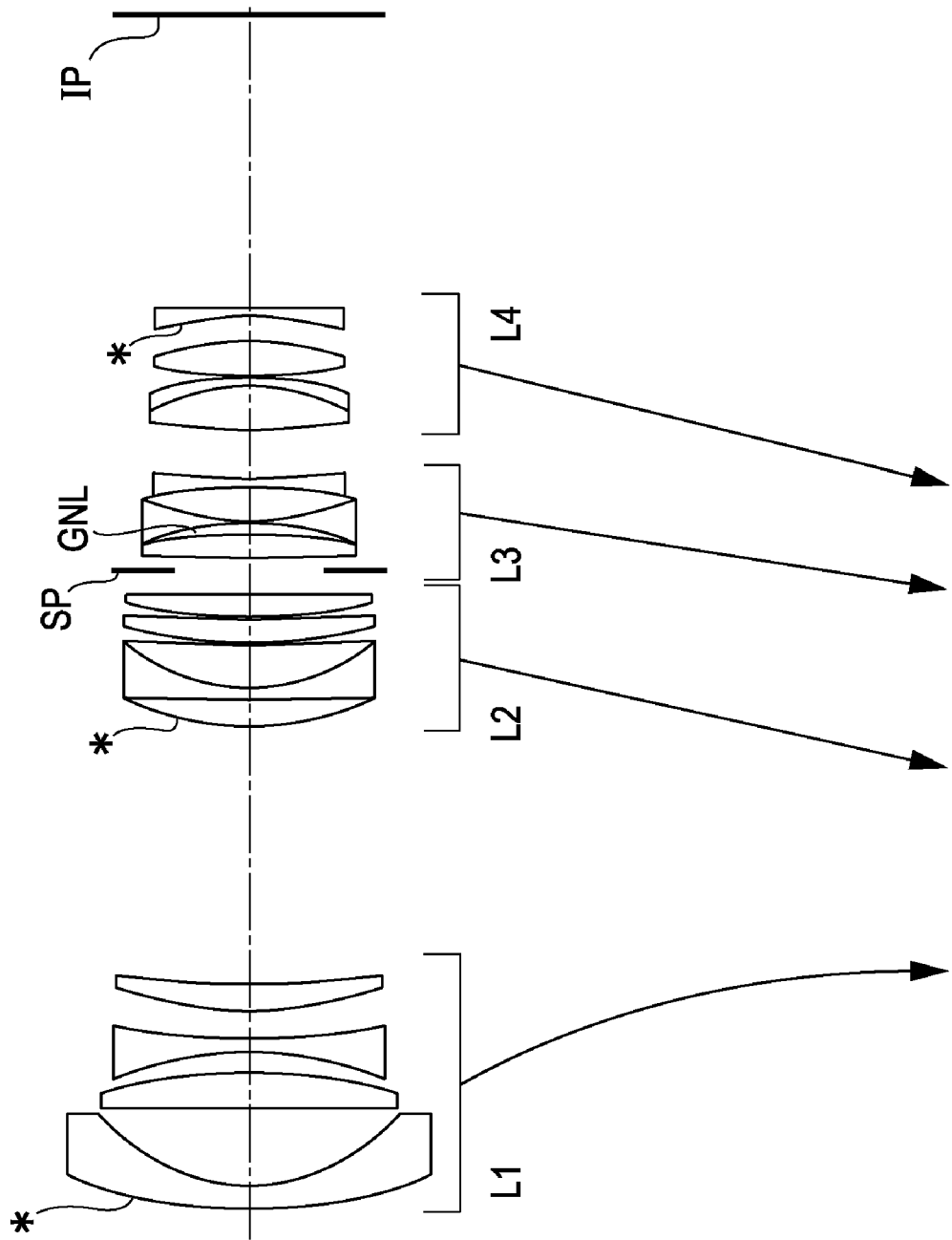
FIG. 4 illustrates a cross-sectional view of a zoom lens system in a wide-angle end state and a locus in zooming according to a second embodiment of the present invention.
Figure 5:
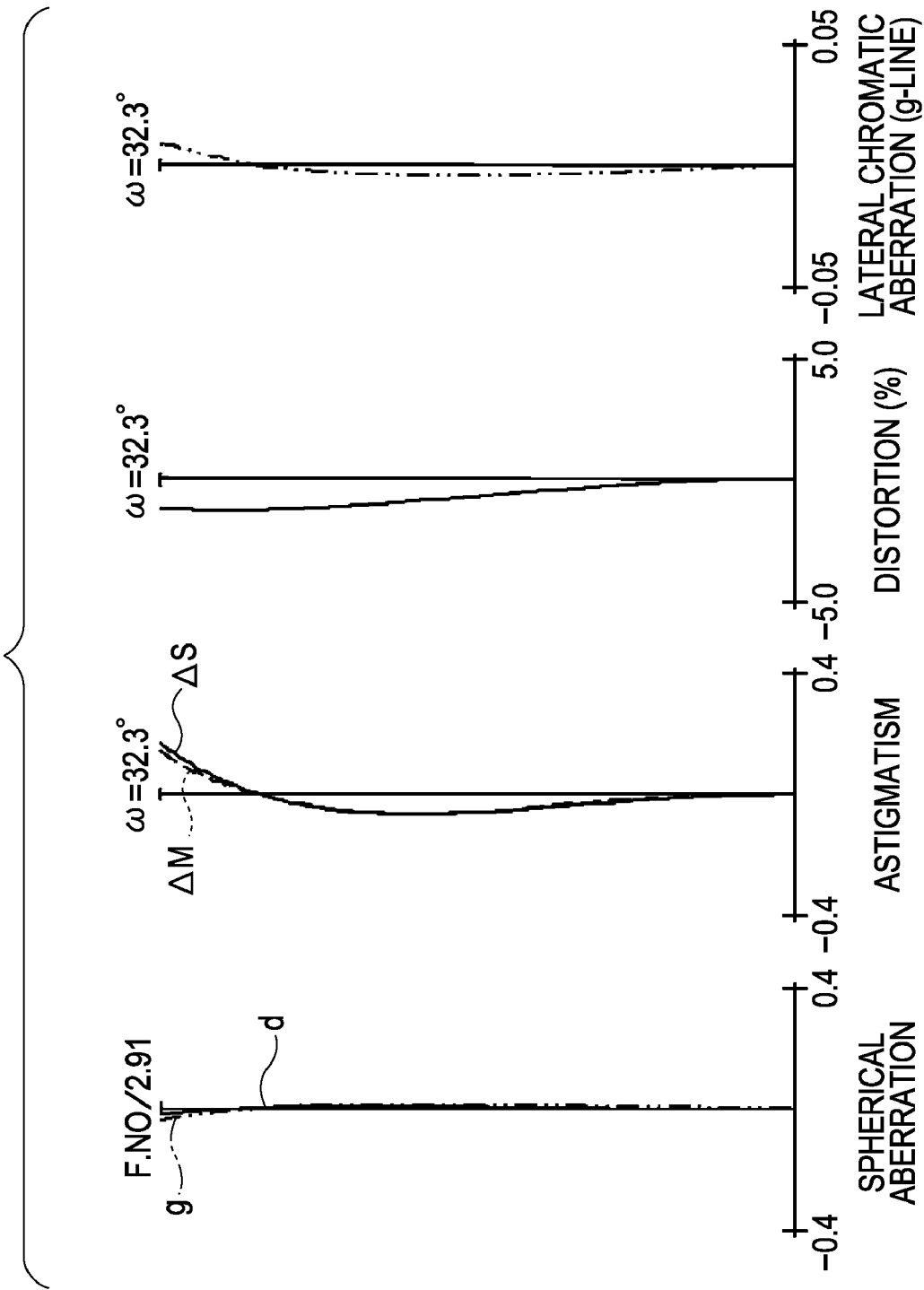
FIG. 5 illustrates aberrations occurring when the zoom lens system according to the second embodiment is in the wide-angle end state.
Figure 6:
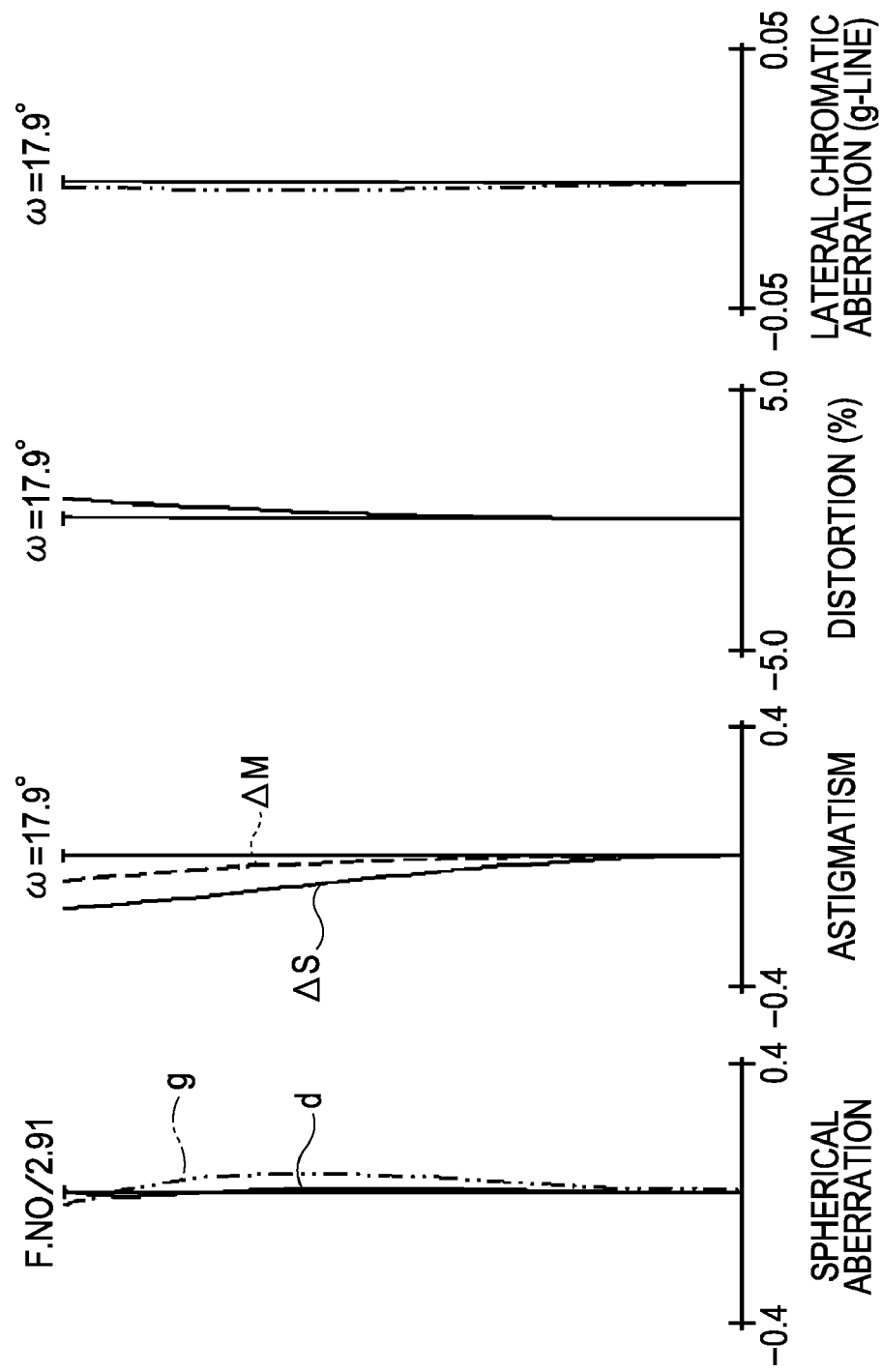
FIG. 6 illustrates aberrations occurring when the zoom lens system according to the second embodiment is in a telephoto end state.

FIG. 4 illustrates a cross-sectional view of a zoom lens system in a wide-angle end state and a locus in zooming according to a second embodiment of the present invention. FIGS. 5 and 6 illustrate aberrations occurring when the zoom lens system of the second embodiment is in the wide-angle end state and in a telephoto end state, respectively. The zoom lens system according to the second embodiment has a zoom ratio of 1.9× and an angle of view of 64.6° to 35.8°.

Figure 7:
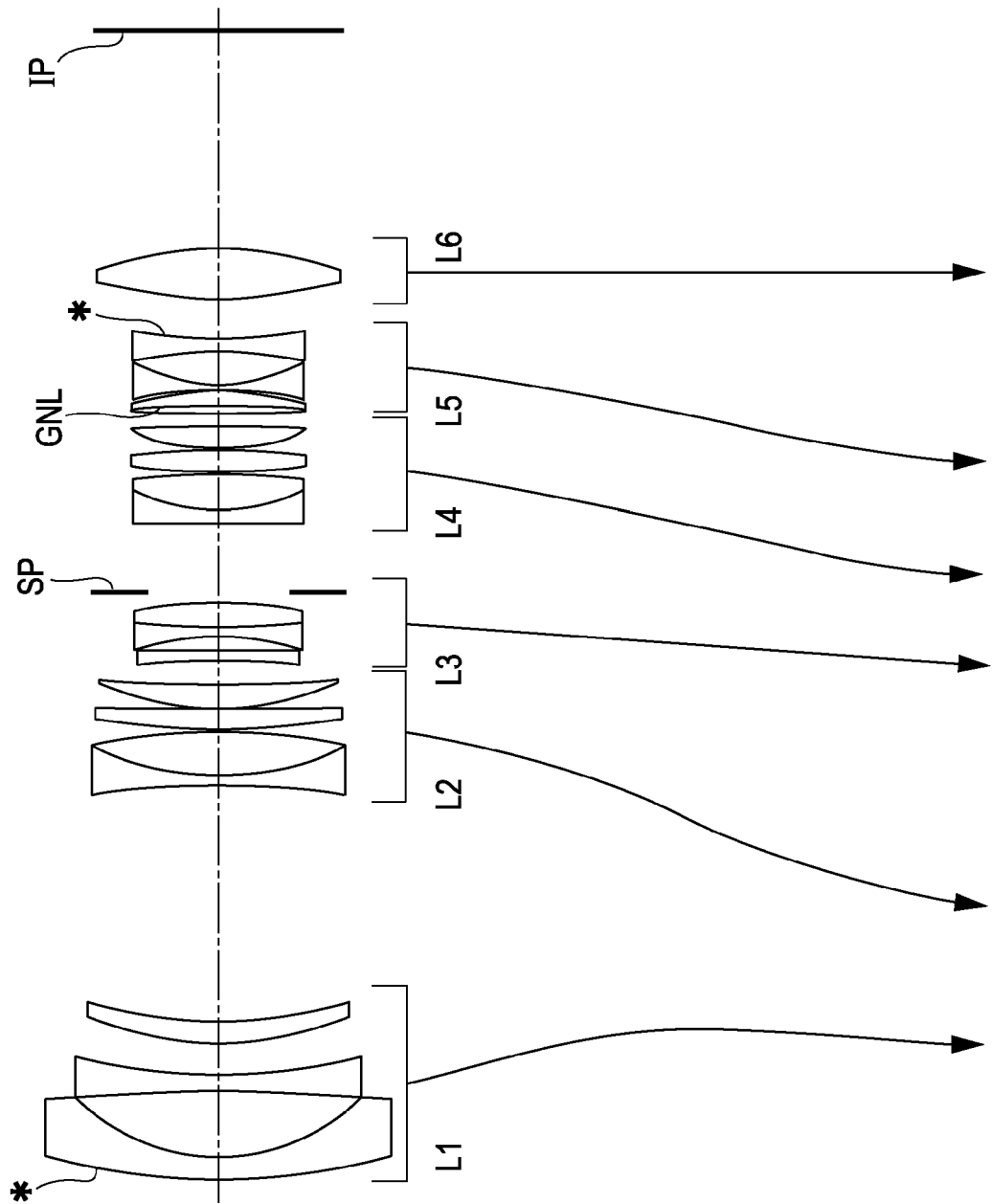
FIG. 7 illustrates a cross-sectional view of a zoom lens system in a wide-angle end state and a locus in zooming according to a third embodiment of the present invention.
Figure 8:
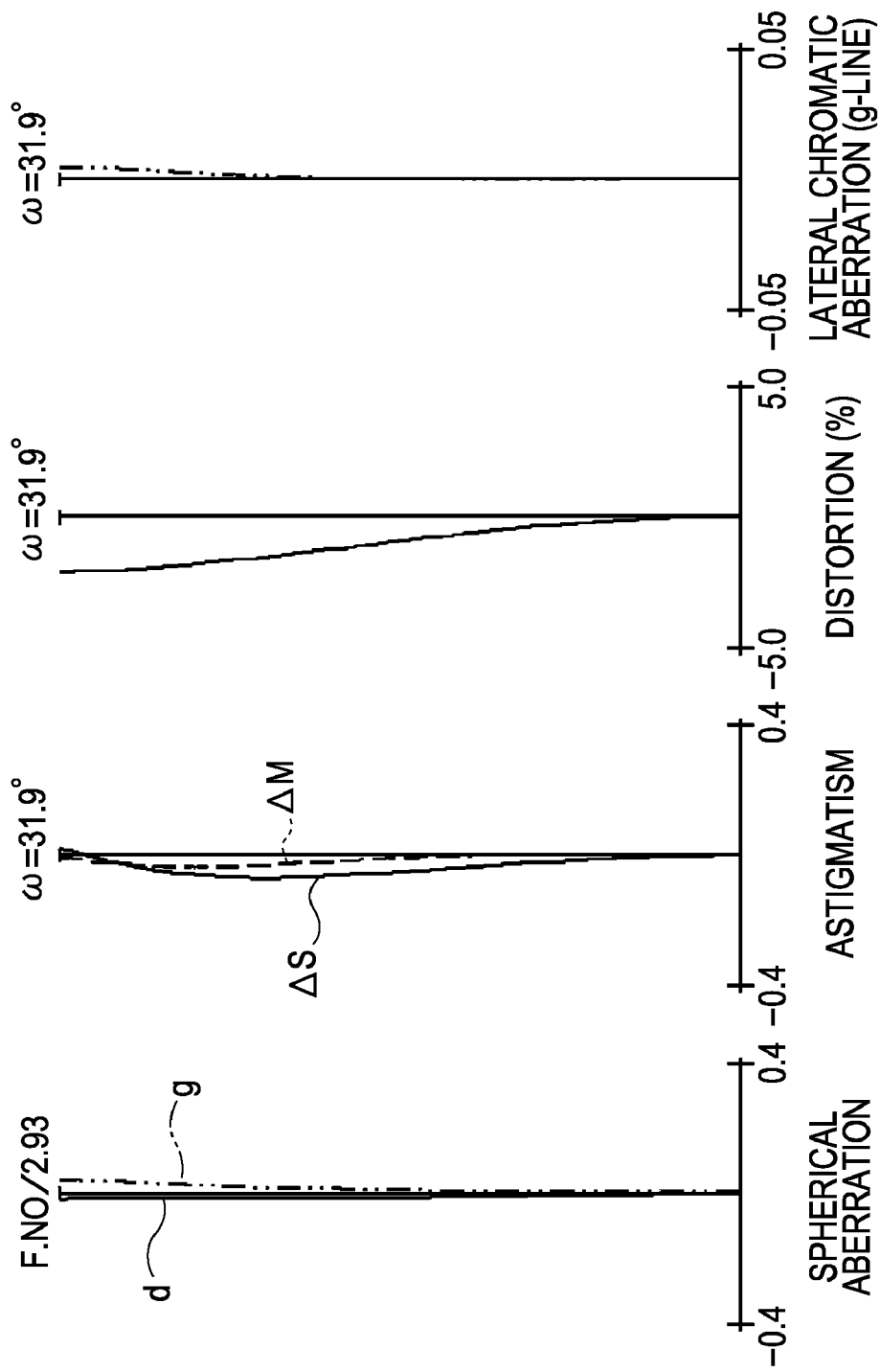
FIG. 8 illustrates aberrations occurring when the zoom lens system according to the third embodiment is in the wide-angle end state.
Figure 9:
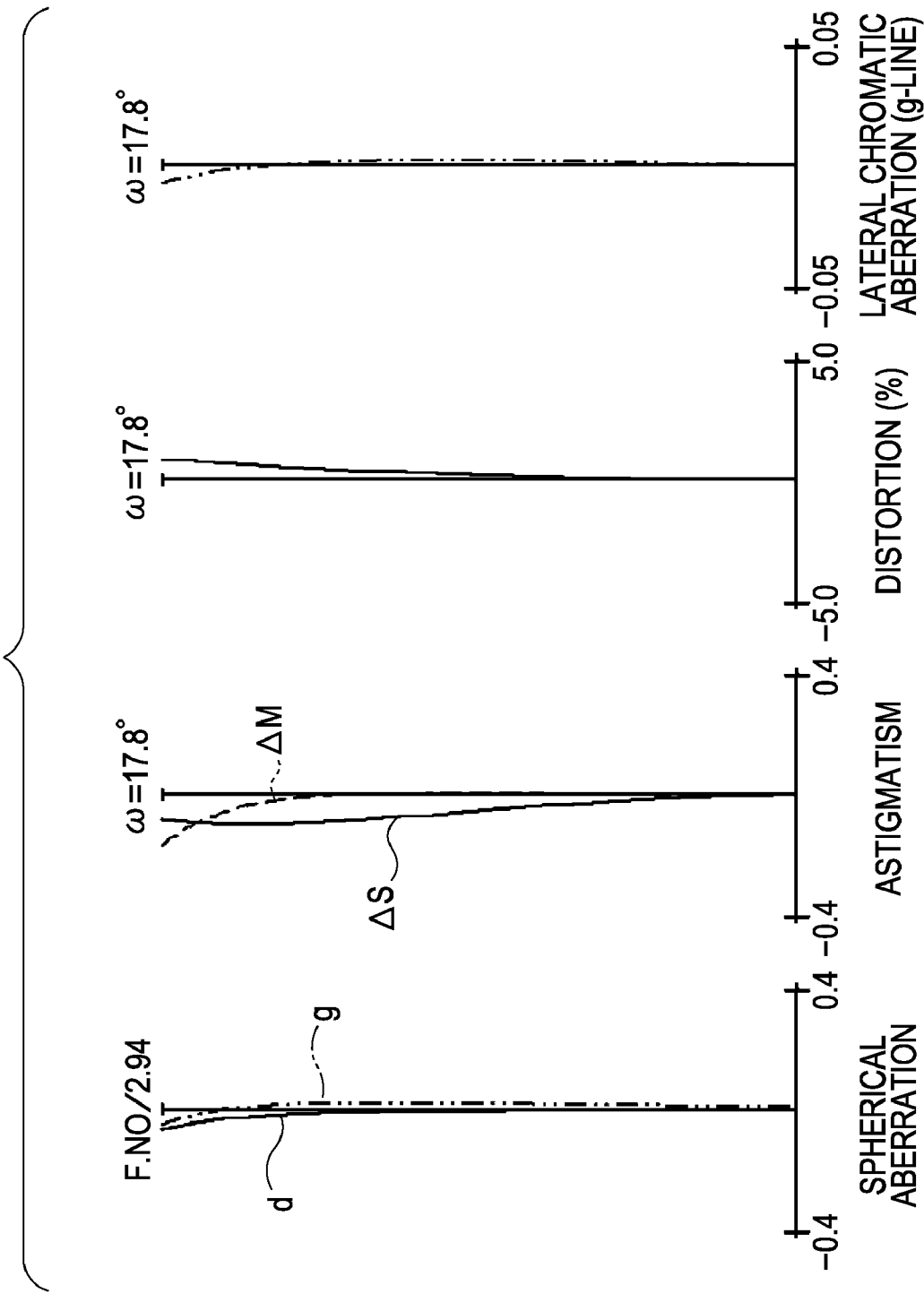
FIG. 9 illustrates aberrations occurring when the zoom lens system according to the third embodiment is in a telephoto end state.

FIG. 7 illustrates a cross-sectional view of a zoom lens system in a wide-angle end state and a locus in zooming according to a third embodiment of the present invention. FIGS. 8 and 9 illustrate aberrations occurring when the zoom lens system of the third embodiment is in the wide-angle end state and in a telephoto end state, respectively. The zoom lens system according to the third embodiment has a zoom ratio of 1.9× and an angle of view of 63.8° to 35.6°.

Figure 10:
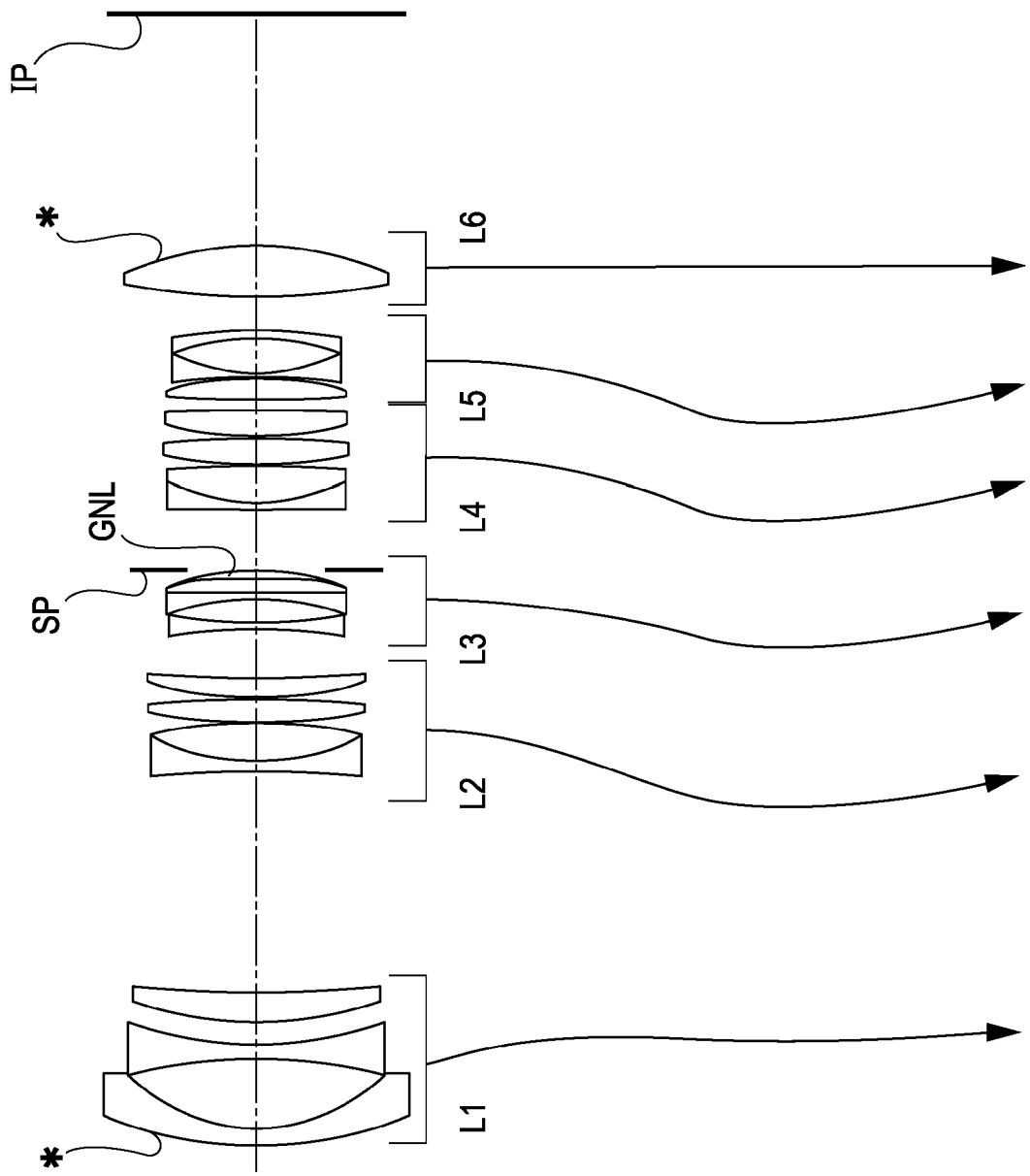
FIG. 10 illustrates a cross-sectional view of a zoom lens system in a wide-angle end state and a locus in zooming according to a fourth embodiment of the present invention.
Figure 11:
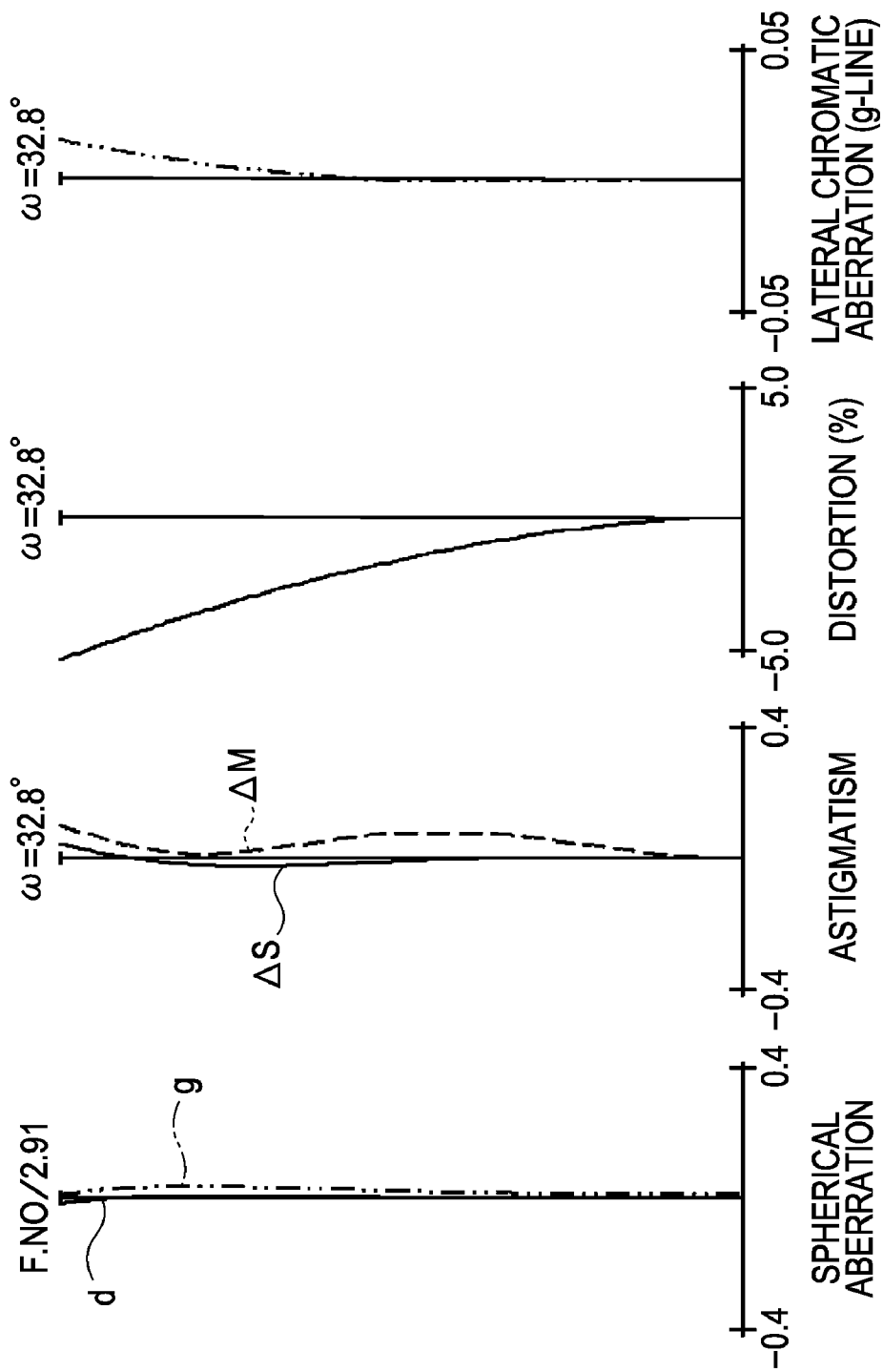
FIG. 11 illustrates aberrations occurring when the zoom lens system according to the fourth embodiment is in the wide-angle end state.
Figure 12:
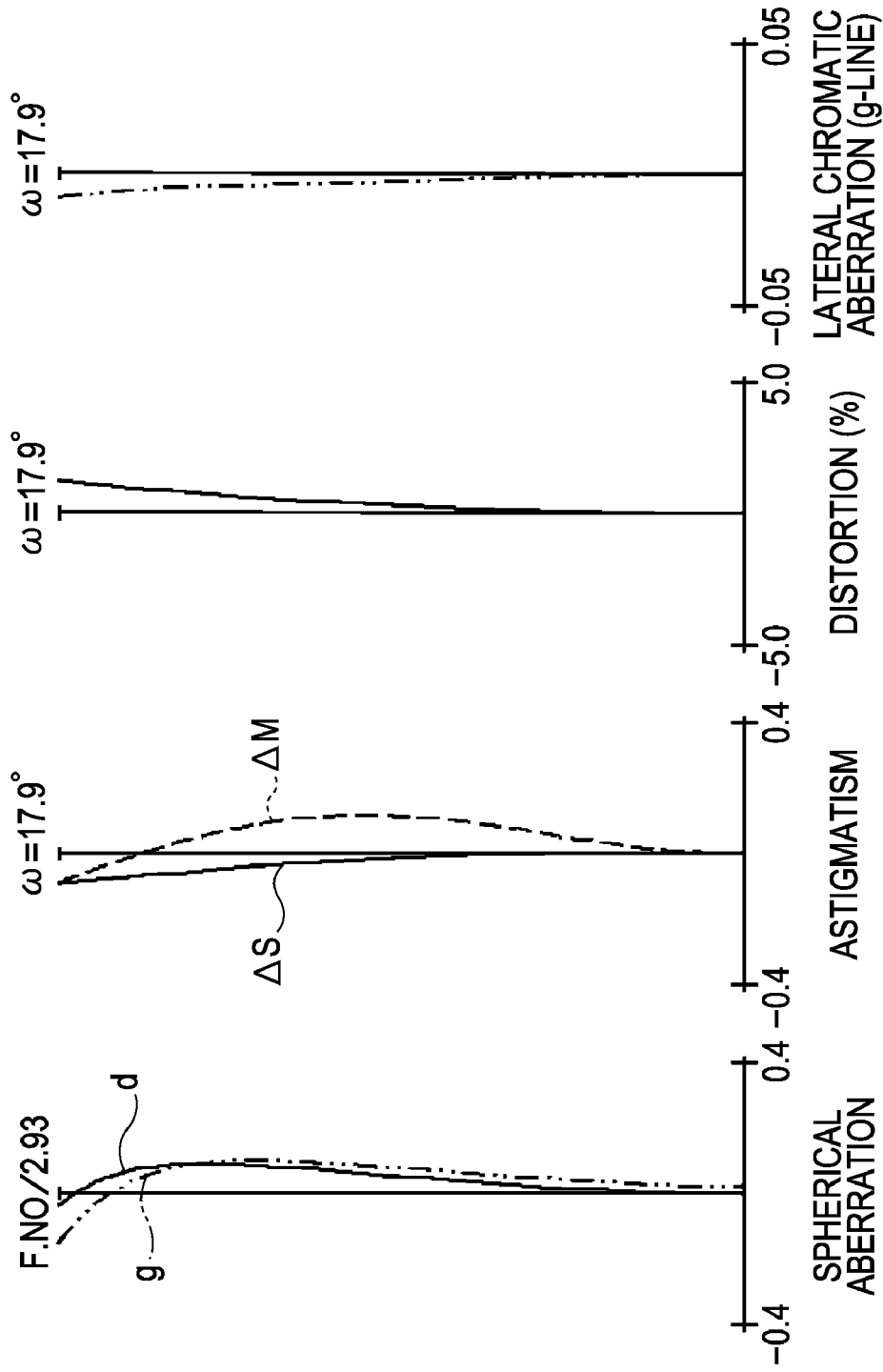
FIG. 12 illustrates aberrations occurring when the zoom lens system according to the fourth embodiment is in a telephoto end state.

FIG. 10 illustrates a cross-sectional view of a zoom lens system in a wide-angle end state and a locus in zooming according to a fourth embodiment of the present invention. FIGS. 11 and 12 illustrate aberrations occurring when the zoom lens system of the fourth embodiment is in the wide-angle end state and in a telephoto end state, respectively. The zoom lens system according to the fourth embodiment has a zoom ratio of 1.9× and an angle of view of 65.60 to 35.9°.

Figure 13:
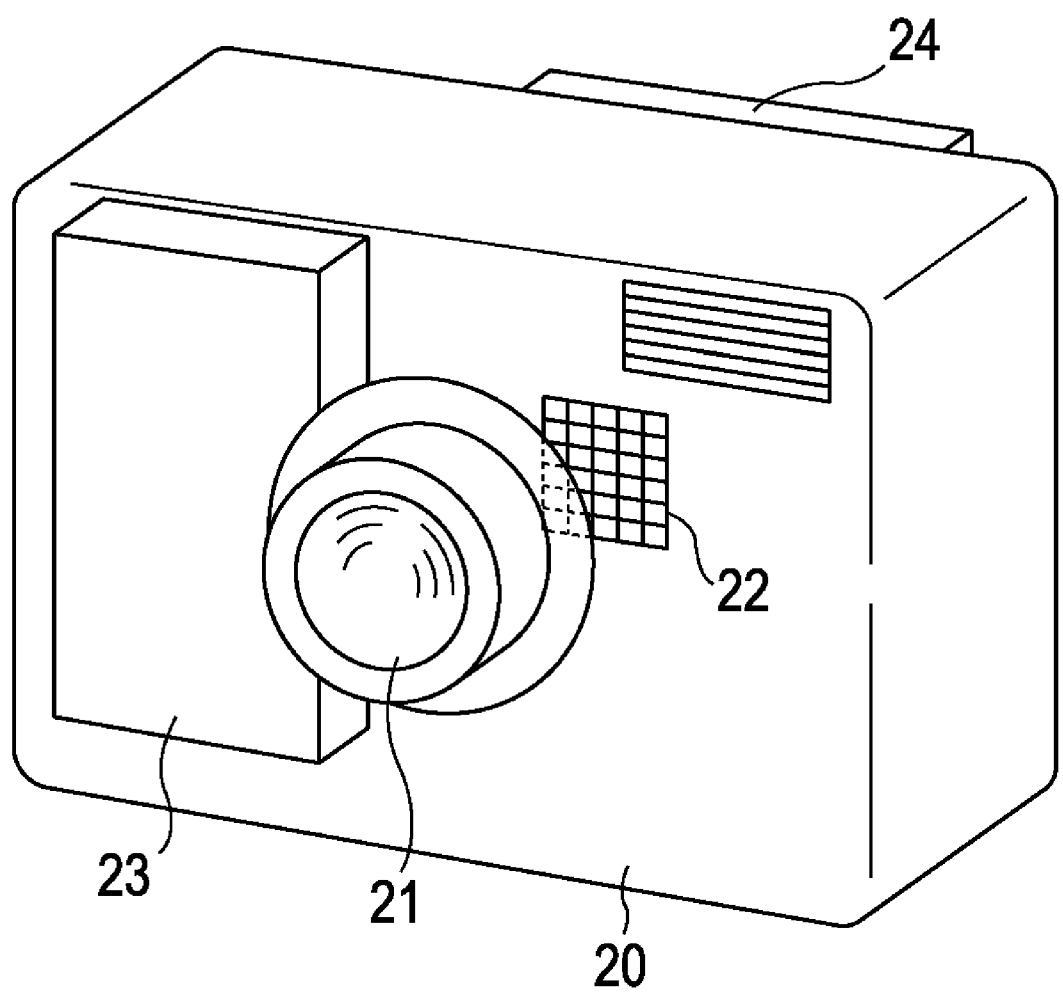
FIG. 13 illustrates a schematic view of a digital camera that uses a zoom lens system according to at least one of the embodiments of the present invention.

FIG. 13 is a schematic illustration of a main portion of a digital still camera (optical apparatus) that includes a zoom lens system according to at least one of the embodiments of the present invention.

The zoom lens system according to the embodiments is an imaging lens system for use in an image pickup apparatus. In the cross-sectional views of the zoom lens system, the left is the object side (front), and the right is the image side (back).

When the zoom lens system according to the embodiments is used as a projection lens in a projector, a screen is positioned at the left side, and an image is projected at the right side.

In the cross-sectional views of the zoom lens system, Li represents an i-th lens unit counting from the object side.

An aperture stop SP is an aperture stop for the zoom lens system. An optical block G corresponds to an optical filter, a faceplate, a crystal low-pass filter, an infrared cut filter, or other optical filters as known by one of ordinary skill in the relevant arts, and equivalents.

An image plane IP is an image plane for the zoom lens system. In the case where the zoom lens system is used as an imaging optical system in a camcorder or a digital still camera, a photosensitive area corresponding an image pickup area of a solid-state image pickup device (photoelectric conversion device) (e.g., a charge-coupled device (CCD) sensor, or a complementary metal-oxide semiconductor (CMOS) sensor, other image pickup devices as known by one of ordinary skill in the relevant arts, and equivalents), is disposed at the image plane IP.

An optical element GNL is composed of an anomalous partial dispersion material, which will be described later.

In the illustrations showing aberrations, "d" denotes the d-line, "g" denotes the g-line, "ΔM" denotes a meridional image plane, "ΔS" denotes a sagittal image plane, and a lateral chromatic aberration is represented by the g-line.

In the illustrations showing aberrations, F.NO represents an F-number, and ω represents a half angle of view.

In the embodiments, the lens units move as illustrated by arrows in zooming from the wide-angle end state to the telephoto end state.

In the embodiments described below, the wide-angle end state and the telephoto end state indicate the zoom positions when the zoom lens system is located at the opposite ends of a range in which the zoom lens system is mechanically movable on the optical path.

In the zoom lens system according to the embodiments, a lens unit closest to the object has a negative refractive power and a lens unit closest to the image has a positive refractive power. The zoom lens system performs zooming while changing the distance between the lens units.

The zoom lens system includes at least one optical element GNL composed of a material that satisfies the following condition:

$$0.755 < \theta_N - (-1.665 \times 10^{-7} \cdot v_N^3 + 5.213 \times 10^{-5} \cdot v_N^2 - 5.656 \times 10^{-3} \cdot v_N) < 1.011 \quad (1)$$

where $\theta_N = (Ng_N - NF_N)/(NF_N - NC_N)$ and $v_N$ is the Abbe number of the material and $Ng_N$, $NF_N$, and $NC_N$ are the refractive indices of the material for the g-line, F-line, and the C-line, respectively.

The zoom lens system satisfies the following conditions:

$$-0.1 < Lt/Tt < 0.2 \quad (2)$$

$$0.20 < \sqrt{(fw \cdot ft)}/f_N < 0.80 \quad (3)$$

where $f_N$ is the focal length of the optical element GNL, Lt is the distance from the aperture stop SP to the optical element GNL in the telephoto end state, Tt is the overall length of the zoom lens system in the telephoto end state, fw is the focal length in the wide-angle end state, and ft is the focal length in the telephoto end state. The distance Lt is positive when being measured to the image side and is negative when being measured to the object side.

When the optical element GNL is cemented, the refractive power (the reciprocal of the focal length) of the optical element GNL is the value obtained when the optical element GNL is arranged in the air after being separated.

In a zoom lens system that includes a lens unit having a negative refractive power at the object side and a lens unit having a positive refractive power at the image side, a so-called retrofocus zoom lens system, a height of axial light from the optical axis (hereinafter referred to as the height of the axial light) tends to become larger in the vicinity of the aperture stop in zooming from the wide-angle end state to the telephoto end state.

For axial chromatic aberration in the telephoto end state, the secondary spectrum tends to increase to the positive side with an increase in the focal length.

To correct the secondary spectrum, it is useful that an optical element having a positive refractive power and being composed of a material that exhibits high anomalous dispersion is arranged in the vicinity of the aperture stop, where the height of the axial light increases.

This enables correction of the focus position for the g-line to the negative side independently when both the focus positions for the C-line and g-line tend to be located at the positive side. Therefore, the secondary spectrum can be reduced.

The conditional expression (1) defines that partial dispersion for the g-line to that for the F-line of the optical element GNL is larger than typical optical glass.

When the upper limit is exceeded, the secondary spectrum in the axial chromatic aberration in the telephoto end state is corrected excessively. When the lower limit is exceeded, the correction is insufficient.

The conditional expression (2) defines that the optical element GNL defined in the conditional expression (1) is positioned adjacent to the aperture stop SP in the telephoto end state. When the upper limit is exceeded, the height of the axial light passing through the optical element GNL is small, thus resulting in insufficient correction of the secondary spectrum. When the lower limit is exceeded, the height of the light passing through the optical element GNL is small, thus resulting in insufficient correction of the secondary spectrum.

The conditional expression (3) defines the positive refractive power of the optical element GNL for correcting the secondary spectrum in the axial chromatic aberration. In general, the secondary spectrum in the axial chromatic aberration in the telephoto end state remains in the positive side.

To correct this, it is useful that an optical element having a positive refractive power and being composed of a material that has high anomalous dispersion is located in the optical system (zoom lens system) at a position effective for correction of the axial chromatic aberration.

When the upper limit is exceeded in the conditional expression (3), correction of the axial chromatic aberration is difficult. When the lower limit is exceeded, the correction of the secondary spectrum is insufficient.

Specifying the components described above facilitates effective correction of the secondary spectrum in the axial chromatic aberration.

The range of values of the conditional expressions (1) to (3) can be set as described below.

$$0.770 < \theta_N - (-1.665 \times 10^{-7} \cdot v_N^3 + 5.213 \times 10^{-5} \cdot v_N^2 - 5.656 \times 10^{-3} \cdot v_N) < 0.900 \quad (1a)$$

$$-0.05 < Lt/Tt < 0.15 \quad (2a)$$

$$0.30 < \sqrt{(fw \cdot ft)}/f_N < 0.60 \quad (3a)$$

The optical element GNL used in the embodiments is composed of resin (resin material) formed by photo polymerization or thermal polymerization using a mold.

To obtain further excellent optical performance in the zoom lens system of the embodiments, it is useful to satisfy at least one of the conditions described below.

The satisfied condition can offer corresponding advantages.

That is, it is useful to satisfy at least one of the following conditions:

$$0.0 < Lt/Lw \leq 1.0 \qquad (4)$$

$$-2.8 < \sqrt{(fw \cdot ft)}/fLN < 0.6 \qquad (5)$$

$$0.01 < t/\sqrt{(fw \cdot ft)} < 0.15 \qquad (6)$$

where Lw is the distance from the aperture stop SP to the optical element GNL in the wide-angle end state, fLN is the focal length of a lens unit including the optical element GNL among the lens units, and t is the thickness of the optical element GNL (in the direction of the optical axis).

In typical optical systems, axial chromatic aberration tends to increase with an increase in the focal length. Also in a zoom lens system, the axial chromatic aberration becomes larger in the telephoto end state. Since a higher zoom ratio leads to a longer focal length, it is important to correct the axial chromatic aberration in the telephoto end state in order to obtain a higher zoom ratio.

The optical element GNL in the embodiments is used to correct the secondary spectrum in the axial chromatic aberration in the telephoto end state. To enhance the advantage of correction, it is useful to arrange the optical element GNL at a position that enables the height of the axial light to be large.

In a retrofocus zoom lens system, the height of the axial light in the telephoto end state tends to become larger in the vicinity of the aperture stop SP. Therefore, it is useful that the optical element GNL satisfying the conditional expression (1) is positioned more adjacent to the aperture stop SP in the telephoto end state.

The conditional expression (4) defines the distance between the optical element GNL and the aperture stop SP in the wide-angle end state and that in the telephoto end state. When the upper limit is exceeded, the optical element GNL is remote from the aperture stop SP in the telephoto end state. In this case, the secondary spectrum in the axial chromatic aberration in the telephoto end state cannot be corrected effectively.

When the lower limit is exceeded, the aperture stop SP and the optical element GNL overlap each other during a zooming operation. In this case, manufacturing a lens barrel is difficult.

The range of values of the conditional expression (4) can be set as described below.

$$0.55 < Lt/Lw \leq 1.00 \qquad (4a)$$

The mechanism for the occurrence of the secondary spectrum in the axial chromatic aberration is described below. The axial chromatic aberration occurring in a positive lens element undergoes insufficient correction (under-correction) extraordinarily in a short-wavelength range. This is because the refractive index of a typical optical material becomes extraordinarily large in a short-wavelength range. To correct the axial chromatic aberration occurring in the positive lens element, a negative lens element composed of a high dispersion material is arranged.

The refractive index of a material of the negative lens element is larger in a short-wavelength range with a degree that is higher than that for the positive lens element. Therefore, when the chromatic aberration is corrected, light of the short wavelength range is strongly dispersed. When primary achromatization in a lens unit included in the zoom lens system is sufficient, if the refractive power of that lens unit is strong, the secondary spectrum occurring in that lens unit is large.

The conditional expression (5) defines an appropriate refractive power of a lens unit LGNL disposing the optical element GNL. When the upper limit is exceeded, the refractive power of the lens unit LGNL is larger in a positive direction. To perform primary achromatization in the lens unit LGNL, a negative lens element composed of a higher dispersion material is necessary, leading to difficulty in selecting such a material.

When the lower limit is exceeded, the refractive power of the lens unit LGNL is strong and the secondary spectrum occurring in the lens unit LGNL is also large. To correct that secondary spectrum, a stronger refractive power of the optical element GNL is necessary. This is undesired for the same reason as the explanation for the conditional expression (3) described above.

The range of values of the conditional expression (5) can be set as described below.

$$-2.00 < \sqrt{(fw \cdot ft)}/fLN < 0.55 \qquad (5a)$$

The optical element GNL used in the embodiments is composed of resin material. More specifically, ultra-violet (UV) curable resin (nd=1.636, vd=22.7, θgF=0.69) is used. However, the material is not limited to this. Any material may be used as long as it satisfies the conditional expression (1).

The conditional expression (6) defines an appropriate thickness of the optical element GNL. In particular, if the optical element GNL is composed of resin material by molding, it is useful that the conditional expression (6) is satisfied. When the upper limit is exceeded, it is difficult to maintain good moldability. When the lower limit is exceeded, it is undesired because the refractive power of the optical element GNL is smaller than the refractive power defined by the conditional expression (3).

The range of values of the conditional expression (6) can be set as described below.

$$0.016 < t/\sqrt{(fw \cdot ft)} < 0.060 \qquad (6a)$$

When the optical element GNL is composed of resin material, forming the optical element GNL by photo polymerization or thermal polymerization using a mold enhances the production efficiency in mass production.

As described above, the zoom lens system according to the embodiments can correct axial chromatic aberration in the telephoto end state with a high zoom ratio, reduce color blurring in an image pickup device having high pixel density, and provide high definition image.

The details of the zoom lens system according to each of the first to fourth embodiments will now be described below.

First Embodiment

The zoom lens system illustrated in FIG. 1 includes a first lens unit L1 having a negative refractive power, a second lens unit L2 having a positive refractive power, and a third lens unit L3 having a positive refractive power disposed in this order from the object side to the image side. During zooming from the wide-angle end state to the telephoto end state, the first lens unit L1 follows a locus convex toward the image side so as to move toward the image side and then toward the object side. The second lens unit L2 moves toward the object side. The third lens unit L3 moves so as to correct the position of the image plane varying with zooming.

The first lens unit L1 has a single aspherical surface. The second lens unit L2 has two aspherical surfaces. These surfaces correct mainly axial aberration and off-axis aberration. An aperture stop SP is disposed adjacent to the object side of the second lens unit L2.

An optical element GNL having a high partial dispersion is arranged in the second lens unit L2 at a position adjacent to the aperture stop SP along the optical axis and corrects mainly axial chromatic aberration in the telephoto end state. The material of the optical element GNL is UV-curable resin (nd=1.636, vd=22.7, θgF=0.69).

A glass block G (e.g., a crystal low-pass filter, an infrared cut filter) is disposed between the third lens unit L3 and an image plane IP.

Second Embodiment

The zoom lens system illustrated in FIG. 4 includes a first lens unit L1 having a negative refractive power, a second lens unit L2 having a positive refractive power, a third lens unit L3 having a negative refractive power, and a fourth lens unit L4 having a positive refractive power disposed in this order from the object side to the image side.

During zooming from the wide-angle end state to the telephoto end state, the first lens unit L1 moves toward the image side. The second lens unit L2 moves toward the object side so as to reduce the distance to the first lens unit L1. The third lens unit L3 moves toward the object side so as to increase the distance to the second lens unit L2. The fourth lens unit L4 moves toward the object side so as to reduce the distance to the third lens unit L3. Each of the first lens unit L1, the second lens unit L2, and the fourth lens unit L4 has a single aspherical surface, thereby correcting axial aberration and off-axis aberration.

An aperture stop SP is disposed adjacent to the object side of the third lens unit L3. An optical element GNL having a high partial dispersion is arranged in the third lens unit L3 at a position adjacent to the aperture stop SP and, in particular, corrects axial chromatic aberration in the telephoto end state. The material of the optical element GNL is UV-curable resin (nd=1.636, vd=22.7, θgF=0.69).

Third Embodiment

The zoom lens system illustrated in FIG. 7 includes six lens units. The six lens units are a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power disposed in this order from the object side to the image side.

During zooming from the wide-angle end state to the telephoto end state, the first lens unit L1 moves toward the image side. The second lens unit L2 moves toward the object side so as to reduce the distance to the first lens unit L1. The fourth lens unit L4 moves toward the object side so as to reduce the distance to the third lens unit L3. The third lens unit L3 moves toward the object side so as to increase the distance to the second lens unit L2. The fifth lens unit L5 moves toward the object side so as to increase the distance to the sixth lens unit L6. The sixth lens unit L6 is fixed (does not move) to an image plane IP. Each of the first lens unit L1 and the fifth lens unit L5 has a single aspherical surface, thereby correcting axial aberration and off-axis aberration.

An aperture stop SP is disposed adjacent to the image side of the third lens unit L3. An optical element GNL having a high partial dispersion is arranged in the fifth lens unit L5 at a position adjacent to the aperture stop SP and, in particular, corrects axial chromatic aberration in the telephoto end state.

The optical element GNL moves closer to the aperture stop SP in the telephoto end state than in the wide-angle end state.

The material of the optical element GNL is UV-curable resin (nd=1.636, vd=22.7, θgF=0.69).

Fourth Embodiment

The zoom lens system illustrated in FIG. 10 includes six lens units. The six lens units are a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power disposed in this order from the object side to the image side.

During zooming from the wide-angle end state to the telephoto end state, the first lens unit L1 moves toward the image side. The second lens unit L2 to the fifth lens unit L5 move toward the object side and then toward the image side independently of each other (follow a locus convex toward the object side).

The sixth lens unit L6 moves so as to approach an image plane IP. Each of the first lens unit L1 and the sixth lens unit L6 has a single aspherical surface, thereby correcting axial aberration and off-axis aberration. An aperture stop SP is disposed adjacent to the image side of the third lens unit L3. An optical element GNL having a high partial dispersion is arranged in the third lens unit L3 at a position adjacent to the aperture stop SP and, in particular, corrects axial chromatic aberration in the telephoto end state. The material of the optical element GNL is UV-curable resin (nd=1.636, vd=22.7, θgF=0.69).

In the embodiments, an optical filter or a lens unit having a small refractive power may be added to the zoom lens system so as to be disposed adjacent to the object side of the first lens unit L1 or to the image side of the backmost lens unit.

A teleconversion lens element or a wide conversion lens element may be added to the zoom lens system so as to be disposed at the object side or the image side.

Numerical examples will now be described below. The numerical examples 1 to 4 correspond to the first to fourth embodiments, respectively. In the numerical examples, represents the order of a surface counting from the object side, Ri represents the radius of curvature of an i-th lens surface, Di represents the distance between the i-th surface and an (i+1)-th surface (the lens thickness or the gap between the lens elements), Ni represents the refractive index of glass of the i-th lens surface, and vi represents the Abbe number of glass of the i-th lens surface.

The aspherical shape is represented by the following expression:

$$X = \frac{(1/R)H^2}{1+\sqrt{1-(1+K)(H/R)^2}} + BH^4 + CH^6 + DH^8 + EH^{10} + FH^{12}$$

where the X-axis indicates the direction of the optical axis, H-axis indicates a direction perpendicular to the optical axis, the direction of travel of light is positive, R is the paraxial radius of curvature, and K, B, C, D, E, and F are the aspheric coefficients.

The numerical examples 1 to 4 and the numerical relationship between the numerical examples 1 to 4 and the conditional expressions (1) to (6) shown in Table 1 will be provided below.

Numerical Example 1 f=4.62~32.18 F.NO=2.80~5.61 2ω=75.3°~12.66°

R 1=172.533 D 1=1.80 N 1=1.772499 ν1=49.6

*R 2=7.376 D 2=3.51

R 3=14.611 D 3=2.40 N 2=1.846660 ν2=23.8

R 4=33.632 D 4=variable

R 5= stop D 5=0.50

*R 6=7.094 D 6=4.15 N 3=1.772499 ν3=49.6

R 7=−10.352 D 7=0.50 N 4=1.620041 ν4=36.3

R 8=5.056 D 8=0.60

R 9=8.438 D 9=0.50 N 5=1.846660 ν5=23.8

R10=4.234 D10=0.66 NGNL1=1.635546 νGNL1=22.7

R11=5.531 D11=2.96 N 6=1.730770 ν6=40.5

*R12=21.134 D12=variable

R13=12.889 D13=2.40 N 7=1.568832 ν7=56.4

R14=−109.607 D14=variable

R15=0.000 D15=1.50 N 8=1.516330 ν8=64.1

R16=0.000

\Focal Length 4.62 17.90 32.18

Variable Distance\

D 4 35.34 5.98 1.43

D12 3.41 21.73 40.05

D14 3.60 3.10 2.60

Aspheric Coefficients

2nd Surface: k=−1.99784e+00 B=3.74169e−04 C=−1.50665e−06 D=8.86082e−09

E=−4.97929e−11

6th Surface: k=−6.58657e−01 B=4.80874e−05 C=9.62458e−07 D=−6.89659e−08

E=1.04318e−10

12nd Surface: k=0.00000e+00 B=−9.44372e−05 C=−8.45980e−06 D=1.05385e−07

E=−9.92052e−08

Numerical Example 2 f=35.00~67.00 F.NO=2.91~2.91 2ω=64.6°~35.8°

*R 1=102.839 D 1=3.50 N 1=1.677900 ν1=55.3

R 2=30.279 D 2=12.60

R 3=1653.798 D 3=5.20 N 2=1.749497 ν2=35.3

R 4=−81.856 D 4=3.15

R 5=−59.372 D 5=2.45 N 3=1.729157 ν3=54.7

R 6=99.791 D 6=4.60

R 7=63.081 D 7=4.15 N 4=1.739998 ν4=28.3

R 8=145.664 D 8=variable

*R 9=52.302 D 9=4.05 N 5=1.772499 ν5=49.6

R10=559.202 D10=1.70 N 6=1.846660 ν6=23.8

R11=32.725 D11=7.00 N 7=1.651597 ν7=58.6

R12=441.532 D12=0.50

R13=80.733 D13=3.75 N 8=1.816000 ν8=46.6

R14=543.964 D14=0.50

R15=80.430 D15=3.70 N 9=1.834807 ν9=42.7

R16=2946.341 D16= variable

R17= stop D17=2.10

R18=1475.367 D18=3.00 N10=1.922860 ν10=18.9

R19=−90.690 D19=1.60 NGNL1=1.635546 νGNL1=22.7

R20=−42.648 D20=1.30 N11=1.696797 ν11=55.5

R21=39.610 D21=4.60

R22=−91.238 D22=1.70 N12=1.516330 ν12=64.1

R23=121.376 D23=variable

R24=106.915 D24=6.65 N13=1.496999 ν13=81.5

R25=−32.233 D25=1.45 N14=1.720467 ν14=34.7

R26=−52.203 D26=0.50

R27=75.621 D27=5.10 N15=1.618000 ν15=63.3

R28=−49.321 D28=4.10

*R29=−66.334 D29=1.35 N16=1.846660 ν16=23.8

R30=458.525

\Focal Length 35.00 52.00 67.00

Variable Distance\

D 8 40.96 15.84 5.22

D16 3.60 6.94 8.32

D23 7.59 3.56 0.93

Aspheric Coefficients

1st Surface: k=4.26877e+00 B=1.21434e−06 C=−1.00898e−10 D=4.92756e−14

E=3.31465e−17

9th Surface: k=−5.16398e−01 B=−8.47836e−07 C=1.16355e−10 D=2.15217e−15

E=−8.95470e−17

29th Surface: k=4.53053e+00 B=−1.62874e−06 C=−2.85392e−10 D=5.52671e−13

E=3.25068e−16

Numerical Example 3 f=35.51~66.67 F.NO=2.93~2.94 2ω=63.8°−35.6°

*R 1=153.741 D 1=3.64 N 1=1.487490 ν1=70.2

R 2=34.895 D 2=11.10

R 3=−222.150 D 3=3.00 N 2=1.539956 ν2=59.5

R 4=85.714 D 4=5.85

R 5=59.944 D 5=3.65 N 3=1.739998 ν3=28.3

R 6=75.907 D 6=variable

R 7=−219.526 D 7=2.60 N 4=1.749500 ν4=35.3

R 8=53.463 D 8=7.40 N 5=1.788001 ν5=47.4

R 9=−103.884 D 9=0.15

R10=106.305 D10=3.80 N 6=1.729157 ν6=54.7

R11=1106.650 D11=0.15

R12=58.788 D12=3.90 N 7=1.729157 ν7=54.7

R13=201.641 D13= variable

R14=−128.018 D14=1.80 N 8=1.658441 ν8=50.9

R15=214.563 D15=2.65

R16=−44.869 D16=1.90 N 9=1.804000 ν9=46.6

R17=134.830 D17=4.35 N10=1.846660 ν10=23.8

R18=−56.160 D18=1.70

R19=stop D19= variable

R20=−470.166 D20=1.90 N11=1.846660 ν11=23.8

R21=33.120 D21=6.35 N12=1.496999 ν12=81.5

R22=−85.516 D22=0.20

R23=79.660 D23=3.90 N13=1.618000 ν13=63.3

R24=−84.262 D24=0.15

R25=39.191 D25=4.30 N14=1.618000 ν14=63.3

R26=−222.698 D26= variable

R27=278.500 D27=1.00 NGNL1=1.635546 νGNL1=22.7

R28=−111.989 D28=2.30 N15=1.846660 ν15=23.8

R29=−69.973 D29=0.15

R30=−92.364 D30=1.65 N16=1.701536 ν16=41.2

R31=28.895 D31=5.15

R32=−58.126 D32=2.20 N17=1.516330 ν17=64.1

*R33=92.519 D33= variable

R34=81.185 D34=8.25 N18=1.487490 ν18=70.2

R35=−58.100

\Focal Length 35.51 51.46 66.67

Variable Distance\

D 6 40.56 17.56 6.00

D13 3.88 14.95 25.32

D19 12.38 6.66 2.00

D26 2.24 2.88 3.48

D33 7.43 15.64 23.41

Aspheric Coefficients

1st Surface: k=3.73789e−01 B=9.71213e−07 C=1.41803e−10 D=−1.10085e−13

E=8.78138e−17 F=−1.76206e−20

33rd Surface: k=3.73756e+00 B=6.13168e−06 C=4.33294e−09 D=−1.24976e−15

E=3.28580e−15 F=5.35113e−19

Numerical Example 4 f=34.67~66.38 F.NO=2.91~2.93 2ω=65.6°~35.9°

*R 1=79.287 D 1=3.00 N 1=1.487490 ν1=70.2

R 2=29.842 D 2=11.46

R 3=−86.752 D 3=2.50 N 2=1.677900 ν2=55.3

R 4=56.434 D 4=3.99

R 5=62.210 D 5=5.18 N 3=1.717362 ν3=29.5

R 6=246.344 D 6= variable

R 7=−168.619 D 7=2.00 N 4=1.749500 ν4=35.3

R 8=48.934 D 8=6.32 N 5=1.712995 ν5=53.9

R 9=−84.501 D 9=0.10

R10=85.342 D10=3.96 N 6=1.696797 ν6=55.5

R11=−265.324 D11=0.10

R12=53.810 D12=3.71 N 7=1.696797 ν7=55.5

R13=210.323 D13= variable

R14=−114.147 D14=1.30 N 8=1.583126 ν8=59.4

R15=73.811 D15=3.77

R16=−42.077 D16=1.30 N 9=1.719995 ν9=50.2

R17=∞ D17=2.05 N10=1.846660 ν10=23.8

R18=−104.307 D18=1.40 NGNL1=1.635546 νGNL1=22.7

R19=−45.886 D19=0.50

R20= stop D20=variable

R21=−1091.424 D21=1.30 N11=1.846660 ν11=23.8

R22=33.810 D22=6.10 N12=1.496999 ν12=81.5

R23=−114.759 D23=0.10

R24=76.016 D24=4.63 N13=1.618000 ν13=63.3

R25=−88.674 D25=0.10

R26=52.751 D26=4.54 N14=1.618000 ν14=63.3

R27=−200.008 D27= variable

R28=233.240 D28=3.45 N15=1.846660 ν15=23.8

R29=−54.516 D29=0.10

R30=−62.007 D30=1.20 N16=1.762001 ν16=40.1

R31=30.570 D31=5.28

R32=−40.862 D32=1.80 N17=1.730770 ν17=40.5

*R33=−77.800 D33= variable

R34=124.518 D34=8.41 N18=1.496999 ν18=81.5

R35=−54.271

\Focal Length 34.67 55.37 66.38

Variable Distance\

D 6 37.56 9.83 3.30

D13 8.21 16.66 20.15

D20 10.20 3.73 2.39

D27 1.96 5.88 7.45

D33 5.83 14.59 22.88

Aspheric Coefficients

1st Surface: k=0 B=1.53240e−06 C=9.84486e−10 D=−1.66115e−12

E=2.29779e−15 F=−9.65031e−19

33rd Surface: k=0 B=4.05423e−06 C=4.80499e−10 D=2.01972e−11

E=−1.36853e−14

TABLE 1

| Conditional Expressions | | Example 1 | Example 2 | Example 3 | Example 4 |
|---|---|---|---|---|---|
| (1) | $\theta_N - (-1.665 \times 10^{-7} \cdot v_N^3 + 5.213 \times 10^{-5} \cdot v_N^2 - 5.656 \times 10^{-3} \cdot v_N)$ | 0.793 | 0.793 | 0.793 | 0.793 |
| (2) | Lt/Tt | 0.10 | 0.03 | 0.11 | −0.01 |
| (3) | $\sqrt{(fw \cdot ft)}/f_N$ | 0.51 | 0.39 | 0.39 | 0.38 |
| (4) | Lt/Lw | 1.00 | 1.00 | 0.71 | 1.00 |
| (5) | $\sqrt{(fw \cdot ft)}/fLN$ | 0.48 | −1.25 | −1.71 | −0.63 |
| (6) | $t/\sqrt{(fw \cdot ft)}$ | 0.05 | 0.03 | 0.02 | 0.03 |

An example of a digital camera (image pickup apparatus) that uses a zoom lens system according to at least one of the embodiments as an imaging optical system will be described below with reference to FIG. 13.

FIG. 13 illustrates a camera body 20 of a digital camera, an imaging optical system 21 including the zoom lens system according to at least one of the embodiments, a solid-state image pickup device (e.g., photoelectric conversion device) 22, such as a CCD, configured to receive light of an object's image through the imaging optical system 21, a memory 23 configured to store information corresponding to the object's image received by the image pickup device 22, and a viewfinder 24 for use in observing the object's image displayed on a display device (not shown).

The display device can be made from a liquid-crystal display panel. An object's image formed on the image pickup device 22 is displayed on this display device.

An image pickup apparatus (e.g., a digital camera) that uses the zoom lens system according to at least one of the embodiments of the present invention has high optical performance with a small size.

The present invention is also applicable to a single-lens reflex camera and a camcorder.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-047136 filed Feb. 27, 2007, which is hereby incorporated by reference herein in its entirety.

What is claimed is:

1. A zoom lens system comprising:

a first lens unit having a negative refractive power;

at least one lens unit having a positive refractive power; and an optical element composed of a material that satisfies the following condition:

$$0.755 < \theta_N - (-1.665 \times 10^{-7} \cdot v_N^3 + 5.213 \times 10^{-5} \cdot v_N^2 - 5.656 \times 10^{-3} \cdot v_N) < 1.011$$

where $\theta_N = (Ng_N - NF_N)/(NF_N - NC_N)$ and $v_N$ is the Abbe number of the material, and $Ng_N$, $NF_N$, and $NC_N$ are the refractive indices of the material for the g-line, F-line, and the C-line, respectively, wherein the first lens unit, an aperture stop, and the at least one lens unit are arranged in this order from an object side to an image side, wherein the zoom lens system performs zooming while changing the distance between the first and the at least one lens unit, and wherein the zoom lens system satisfies the following conditions:

$$-0.1 < Lt/Tt < 0.2$$

$$0.20 < \sqrt{(fw \cdot ft)}/f_N < 0.80$$

where $f_N$ is the focal length of the optical element, Lt is the distance from the aperture stop to the optical element in a telephoto end state, Tt is the overall length of the zoom lens system in the telephoto end state, fw is the focal length in a wide-angle end state, and ft is the focal length in the telephoto end state.

2. The zoom lens system according to claim 1, wherein the following condition is satisfied:

$$0.0 < Lt/Lw \leq 1.0$$

where Lw is the distance from the aperture stop to the optical element in the wide-angle end state.

3. The zoom lens system according to claim 1, wherein the following condition is satisfied:

$$-2.8 < \sqrt{(fw \cdot ft)}/fLN < 0.6$$

where fLN is the focal length of a lens unit including the optical element among the lens units.

4. The zoom lens system according to claim 1, wherein the following condition is satisfied:

$$0.01 < t/\sqrt{(fw \cdot ft)} < 0.15$$

where t is the thickness of the optical element.

5. The zoom lens system according to claim 1, wherein the at least one lens unit having a positive refractive power comprises a second lens unit having a positive refractive power and a third lens unit having a positive refractive power, wherein the first lens unit, the aperture stop, the second lens unit, and the third lens unit are arranged in this order from the object side to the image side, and wherein the optical element is included in the second lens unit.

6. The zoom lens system according to claim 1, further comprising:

a second lens unit having a positive refractive power; and a third lens unit having a negative refractive power, wherein the at least one lens unit having a positive refractive power comprises a fourth lens unit having a positive refractive power, wherein the first lens unit, the second lens unit, the aperture stop, the third lens unit, and the fourth lens unit are arranged in this order from the object side to the image side, and wherein the optical element is included in the third lens unit.

7. The zoom lens system according to claim 1, further comprising:

a second lens unit having a positive refractive power;

a third lens unit having a negative refractive power; and a fifth lens unit having a negative refractive power, wherein the at least one lens unit having a positive refractive power comprises a fourth lens unit having a positive refractive power and a sixth lens unit having a positive refractive power, wherein the first lens unit, the second lens unit, the third lens unit, the aperture stop, the fourth lens unit, the fifth lens unit, and the sixth lens unit are arranged in this order from the object side to the image side, and wherein the optical element is included in the third lens unit or the fifth lens unit.

8. An optical apparatus comprising:
a zoom lens system according to claim 1; and
a solid-state image pickup device configured to receive an image formed by the zoom lens system.

* * * * *